April 19, 1927.
T. W. W. FORREST
PASTEURIZER
Filed Nov. 22, 1924
1,625,529
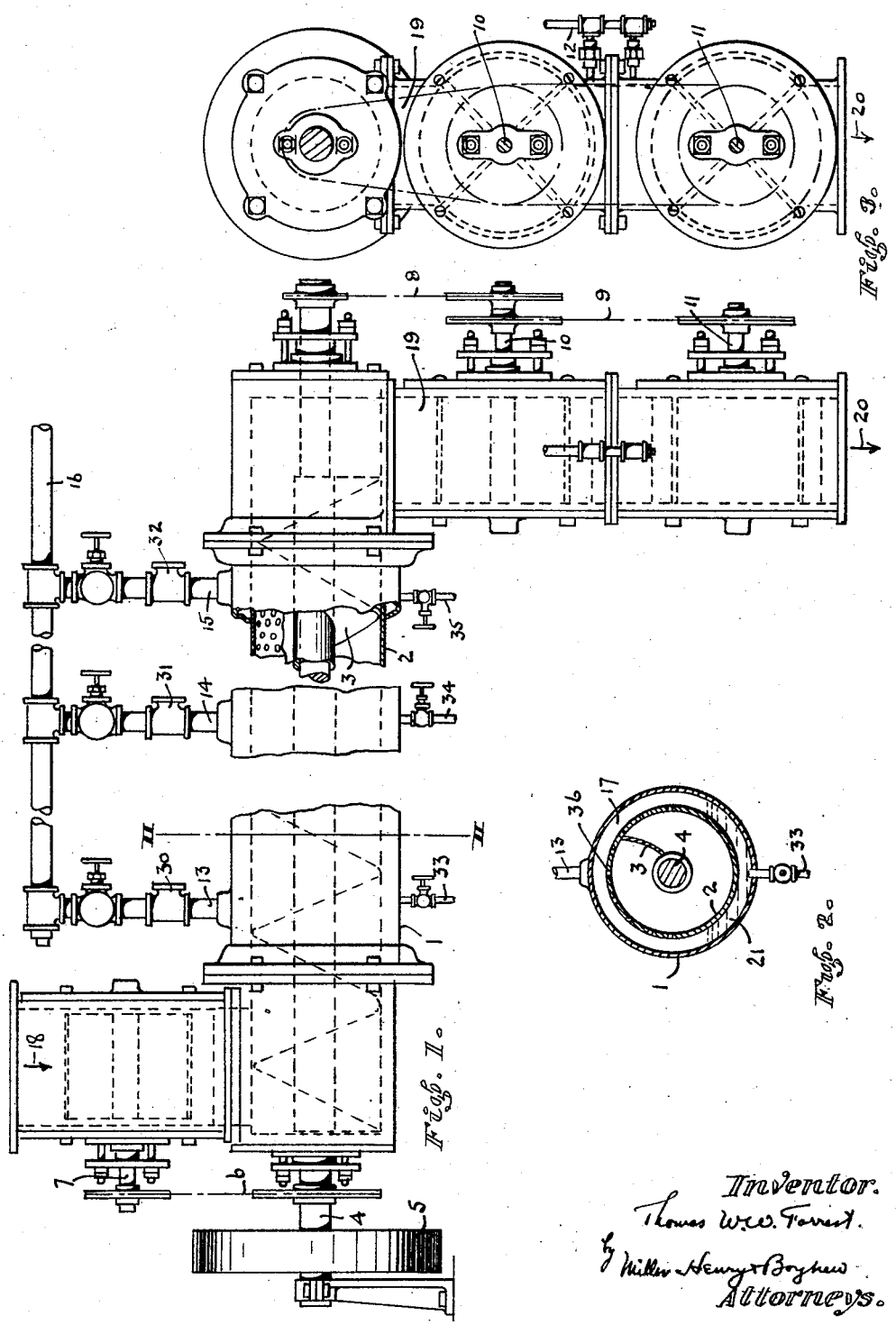

Patented Apr. 19, 1927.

1,625,529

UNITED STATES PATENT OFFICE.

THOMAS W. W. FORREST, OF OAKLAND, CALIFORNIA, ASSIGNOR TO SUN-MAID RAISIN GROWERS OF CALIFORNIA, OF FRESNO, CALIFORNIA, A COOPERATIVE ASSOCIATION OF CALIFORNIA.

PASTEURIZER.

Application filed November 22, 1924. Serial No. 751,568.

My invention has for its object means and methods for Pasteurizing food products and is particularly adapted to the Pasteurizing of raisins and the like, the treatment of which as an example of my invention will be fully described below, and which treatment forms in reality the first portion of the complete method of processing raisins as described in my copending patent application filed under Serial Number 1951.

I am well aware that food products have heretofore been Pasteurized by hot water, also by steam and third by a combination of steam and hot water, all of which methods are open to numerous objections.

In the Pasteurizing of raisins the common methods heretofore practiced have produced wet and soggy raisins which stick together in masses necessitating subsequent handling and treatment before they are suitable for packing. The raisins during the treatment absorb and hold the heat and also absorb an excess of moisture, frequently resulting in the formation and running of syrup which ruins the packages. Moreover the methods heretofore employed have resulted in the heating of the raisins as a whole, that is the interior of the raisin is raised above 145° F. resulting in a destruction of some of the most desirable sugar content or its transformation into caramel, and therefore also a loss of some of the raisin flavor. The excess of moisture also carries off a considerable percentage of the sugar, reducing the flavor, changing the color and food value.

All of these objections are overcome to a greater or less degree by employing my Pasteurizer and method of treatment which consists primarily of heating the raisins with super-heated steam for a period of a few seconds only and I have found from practice twenty to thirty seconds to be ample.

The application of the higher heat for the shorter space of time than heretofore causes the skin of the raisin to reach a relatively high temperature without any considerable increase of temperature in the interior of the raisins and without introducing within the raisin any excess of moisture.

In other words, the skin is thoroughly Pasteurized and conditioned before the interior of the raisin has been raised to a sufficient degree to cause any destruction of sugar or other deterioration and the heat application is then stopped, resulting in a softened skin and a sufficient swelling of the cellular tissues and a hydrolyzation of some of the cellulose.

This softening of the skin with the resulting mild inside temperature allows a proper removal of the seeds. The treatment is sufficiently rapid to prevent excessive moisture or the washing away of the sugar. The seeded raisins are dried and thereafter flow freely and there is no massing or stickiness in the final product.

The full food value of the raisins and their natural color are retained.

By referring to the accompanying drawings my invention will be made clear.

Fig. 1 is a longitudinal view of an apparatus employing my invention.

Fig. 2 is a cross section of Fig. 1 on the line II—II thereof.

Fig. 3 is an end view of the discharge end of the apparatus of Fig. 1.

Throughout the figures similar numerals refer to identical parts.

A main casing is indicated by the numeral 1 which is preferably of tubular form and has concentrically mounted therein an inner casing 2 perforated in its upper half substantially throughout its length. Mounted within the inner casing 2 is the spiral conveyer 3 carried on the shaft 4 adapted to be driven by the pulley 5 from any source of power. Synchronously therewith the chain drive 6 operates the inlet rotary valve 7 and the chain drives 8, and 9 operate the discharge primary valve 10 and secondary valve 11 respectively. The space between the valves 10 and 11 is exhausted by any conventional means through the exhaust pipe 12, and super-heated steam is admitted through the pipes 13, 14 and 15 from the main steam supply pipe 16 passing freely into the upper portion 17 of the compartment 21 formed between 1 and 2.

At 30, 31, 32 are water connections whereby moisture may be added to the inflowing steam to suit the requirements of any special treatment and at all times under the control of the operator.

The super-heated steam passing through the numerous perforations in the upper part of the inner casing 2 comes in contact with the raisins during their passage under the action of the conveyer 3 from the supply inlet as indicated by the arrow 18. The raisins during their treatment are caused to pass through the inner compartment and are discharged into the casing 19 of the valve 10. Due to the super-heated condition of the steam under which the raisins are Pasteurized during their transit and through the inner casing 2 there would be a discharge of said steam were it not for the secondary discharge valve 11 and a space between the valves 10 and 11 which is kept exhausted through the conventional connections at 12.

Suitable bleeders or drains are provided at 33, 34, 35, for controlling the steam and water discharge from the compartment 21 and to enable the operator to secure the conditions of heat and moisture treatment best suited in any case.

At 36 I have shown the upper portion of the inner casing opposite the steam inlets as not perforated to serve as a baffle and prevent any extra intense action on the raisins when passing thereunder.

I have found that in the Pasteurizing and conditioning of raisins for seeding and packing that a treatment with super-heated steam for a period of not to exceed thirty seconds is ample and the apparatus is preferably timed to transfer the raisins from the inlet to the valve 10 within approximately twenty seconds.

The raisins upon passing through the valve 10 come into the exhaust compartment between the valves 10 and 11 and the excess steam and moisture is there removed so that the raisins pass out at 20 in a relatively dry puffed up condition with the skins sufficiently heated and moisture treated to enable the raisins to be readily seeded.

Referring particularly to Fig. 2, it will be noted that I have shown a water jacket in the compartment 21 between the casing 1 and 2, which water jacket may be varied by the operator to suit any given set of conditions. This water is the result of condensation from the super-heated steam entering from the pipe 16 and by its employment the temperature of the raisins within the inner casing 22 is moderated or controlled.

It will now be seen that the skins of the raisins during their passage and treatment are subjected to a relatively dry intense heat not less than 212° F. for a brief space of time during which the heat action is not permitted to penetrate beyond the surface layers of the raisin and the center of the raisin at no time to exceed 145° F.

I claim:

1. Dried fruit Pasteurizing mechanism comprising a horizontally arranged tubular outer casing provided with upper controlled steam supply means and lower controlled drainage means, a cylindrical inner casing spaced within the outer casing and a conveyor therein adapted to transfer material through said inner casing, said inner casing being provided with a plurality of perforations on its upper side only open to the space between the cylinders to allow steam action therethrough from said space on said material and said inner casing provided with an inlet valve to control the fruit to the conveyor and an outlet therefor and means to restrain the outflow of the fruit therefrom to retain the steam.

2. Dried fruit Pasteurizing mechanism comprising an outer horizontally arranged tubular casing and a spaced inner cylindrical casing, a controlled steam supply means and a controlled drainage means to the outer casing, a conveyor in said inner cylindrical casing for fruit to be Pasteurized, said inner casing being perforated in its upper portion only and provided with an inlet valve to control and deliver the fruit to the conveyor, a pair of outlet valves in series and exhausting means interposed between said outlet valves.

3. In mechanism as set forth in claim 1 water supply means to said outer casing, and means for controlling the depth of water between the casings.

4. In mechanism as set forth in claim 2 water supply means to said casing adapted to mingle the water with steam from said steam supply means.

5. A structure as specified in claim 1 in which said steam supply means comprises a steam nozzle entering through the upper part of said outer casing only and provided with a baffle to prevent the steam passing straight from the nozzle through the perforations of said cylindrical casing.

THOMAS W. W. FORREST.